(12) United States Patent
Ibrahim et al.

(10) Patent No.: US 10,114,770 B2
(45) Date of Patent: Oct. 30, 2018

(54) HOMOGENOUS DEVICE ACCESS METHOD WHICH REMOVES PHYSICAL DEVICE DRIVERS IN A COMPUTER OPERATING SYSTEM

(71) Applicant: UNIVERSITI TEKNOLOGI MALAYSIA, Johor Bahru, Johor (MY)

(72) Inventors: Muhammad Nasir Bin Ibrahim, Johor Darul Takzim (MY); Namazi Bin Azhari, Selangor Darul Ehsan (MY); Adam Bin Baharum, Pulau Pinang (MY)

(73) Assignee: Universiti Teknologi Malaysia, Johor Bahru (MY)

( * ) Notice: Subject to any disclaimer, the term of this patent is extended or adjusted under 35 U.S.C. 154(b) by 0 days.

(21) Appl. No.: 14/871,038

(22) Filed: Sep. 30, 2015

(65) Prior Publication Data

US 2016/0224477 A1 Aug. 4, 2016

Related U.S. Application Data

(60) Provisional application No. 62/032,118, filed on Aug. 1, 2014.

(51) Int. Cl.
*G06F 13/10* (2006.01)
*G06F 13/28* (2006.01)

(52) U.S. Cl.
CPC ............ *G06F 13/102* (2013.01); *G06F 13/28* (2013.01)

(58) Field of Classification Search
CPC .............................. G06F 13/102; G06F 13/28
See application file for complete search history.

(56) References Cited

U.S. PATENT DOCUMENTS

| | | | | |
|---|---|---|---|---|
| 5,296,936 A * | 3/1994 | Pittas | ........................ | G09B 5/14 358/404 |
| 8,392,933 B2 * | 3/2013 | Borghini | ................... | G06F 9/54 719/311 |
| 2002/0038393 A1 * | 3/2002 | Ganapathy | .............. | G06F 13/28 710/22 |

(Continued)

*Primary Examiner* — Hyun Nam
*Assistant Examiner* — John Roche
(74) *Attorney, Agent, or Firm* — Ladas & Parry LLP (57) ABSTRACT

A model and access method for devices to be homogenous irrespective whether they be character or block types. The access method is closely coupled between a host processor and the input/output (I/O) ports either through the data ports to the FIFOs (First-In-First-Out), or the control ports of the devices. Data transfers to the devices are effected through their data ports, while the control words in the form of bytecodes are sent through the control ports. The access method enables parallel processing within independent devices as they can execute device specific codes in parallel with the system software or kernel. The bytecodes are portable across hardware platforms since they serve as command words for configuration of devices and command instructions for the burst mode transfer of data between devices and a processor. With an interplay of just one I/O arbiter consisting of FIFOs and port engines to which devices are attached, presents a homogenous view of devices as a FIFO oriented access method that supports synchronous burst data transfers, removing the physical device driver codes in the kernel and system memory space.

8 Claims, 5 Drawing Sheets

(56) References Cited

U.S. PATENT DOCUMENTS

2011/0165896 A1* 7/2011 Stromberg ............. G06Q 20/32
455/466
2015/0009743 A1* 1/2015 Chung ................. G11C 29/028
365/96

* cited by examiner

HOMOGENOUS DEVICE ACCESS METHOD WHICH REMOVES PHYSICAL DEVICE DRIVERS IN A COMPUTER OPERATING SYSTEM

RELATED APPLICATION INFORMATION

This application claims the benefit of U.S. Provisional Application No. 62/032,118 filed Aug. 1, 2014, and incorporates the same by reference.

TECHNICAL FIELD

This invention relates to computer architecture in particular, the device driver access method.

BACKGROUND OF INVENTION/ART

When Unix was being developed in 1969 based on a filesystem, the concept of device drivers was already well defined, when it was also viewed as an extension of the same filesystem. Also the model of a portable operating system was already decided early on when it was broken into two main components; the device independent component (the logical layer of the device) which required it to be written in a high-level language such as C and the hardware-dependent (the physical layer of the device) component in which the device driver model maps the low-level data structures of the physical device to high level data structures of the logical device. Therefore the Unix filesystem has no explicit device associated with the way the information is laid down as it deals with data as a block entity and has no knowledge of how a block is composed, in an effort to make the OS kernel as portable as possible.

This model which was also adopted by Posix (portable-operating-system-interface-for-unix) continued to this day, especially in the world-wide use of the GNU/Linux system in all professional applications.

Though current (2012) OS models such as Unix, Linux, and GUI (Graphical-User-Interface) such as Windows, and Android use a number of hardware-abstraction-layer (HAL) in the virtual-file-system (VFS), block device, the driver codes specific to a hardware can exist in the kernel as the Kernel-Mode-Driver-Framework (KMDF), or by loadable module which is called upon only when needed. Also another method, the User-Mode-Driver-Framework (UMDF) moves driver codes outside the kernel.

Nevertheless, the OS at some point will need to execute the physical driver codes which exist in the visible memory space that requires device-specific control. In effect, this makes the kernel hardware-dependent rendering it not only unportable, but unusable to an upgrade of the same platform. Though the HAL insulates an OS from vendor-specific hardware, the HAL still resides in the OS memory space. This has two major impediments: first, the system processor cannot run another process when it is executing the physical driver codes or parallel processing (not multitasking), and second, a device manufacturer must supply the physical device driver. That is why the need for specific kernel upgrades even for the most basic change of computer devices such as video and sound.

There is then a need for the HAL to move to the device end itself and implementing FIFOs which is the subject of this patent. When this happens, a correspondingly beneficial effect emerges which creates a new model requiring the device to be treated as a homogenous device. It does not only stop at this, but other spin-offs are created as well; with the addition of FIFOs for every device ports, traditional computer components can be removed as well; the DMA engine, multi-arbiters, multi-bus, and an I/O bus such as the PCI.

A very similar invention was initiated by the I2O (intelligent-I/O) Special Interest Group (I2OSIG) which published the I2O specification in 1996. The steering committee members included HP, Intel, Microsoft, Novell, Adaptec, 3Com and more than sixty other members which included corporations such as Acer, ARM, Dell, Fujitsu, Samsung, Seagate, Siemens and Western Digital among many others. The only similarity is that the HAL is also moved outside the OS address space and into the device end itself. But the FIFO oriented view was not included which made the two inventions diverged radically, making the I2O a far more complex implementation with its message passing interface and protocol.

SUMMARY OF THE INVENTION

The invention as described in this patent document differs in many distinct ways as summarized below.

1) this invention does not use any specific I/O processor with its own set of development tools such as an I/OC compiler, own local bus, own boot memory, own executable space, shared memory, and DMA; 2) this invention is FIFO oriented; that is, the host processor only sees FIFOs, 3) the I2O did not specifically mentioned removal of DMA engine (in fact it specified not only a common DMA, but a local DMA too), multi-arbiters, multi-bus, and an I/O bus such as the PCI; 4) the devices in the I2cannot execute codes in parallel as they rely on a single I/O processor in one particular I/O segment; 5) the I2O allowed peer-to-peer transfers; 6) the I2O did not view I/O devices as homogenous as it was not a FIFO oriented I/O system; 7) the I2O depended heavily on message passing interface (MPI) which requires a request-reply protocol, compared to simple bytecodes in this invention; 8) the I2O can have segmented I/O processors with independent buses that create addressing transaction spaces for I/O, memory, and configuration which is very similar to the PCI, 9) the I2O specified three categories of memories within each segment; system memory, I/O processor private memory, and shared memory with different schemes of access, 10) the I2O specified an expansion bus such as the PCI and considered it the key to open platform, whereas this invention specifically eliminates the PCI, 11) the I2O provisioned bus mastering, whereas this invention treats all I/O devices as homogenous, 12) the I2O commands from host, and between I/O devices are delivered via message passing interface with multiword protocol and variable payload, requiring at least six 32-bit words or 192 bytes.

In summary of this invention, a device driver model which removes the entire physical layer device driver codes which in the current model is within the operating system visible memory space, as well as the application software space, to the device ports and hence not visible to the OS and application memory space. Supporting this a FIFO oriented I/O device is implemented, thus presenting them as a homogenous view to the host computer system or processor.

When the physical layer device driver is removed from the OS memory space, some means must be established to access and control the device. This is achieved by implementing two different ports for each device; a data port and a control port. Data transfers which can only be synchronous burst take place over the data port, and control words in the form of command bytecodes take place over the control port. The bytecodes by nature provide a device access model that is uniform and homogenous to the upper layers. The bytecodes differ markedly to a message passing interface (MPI) in that it is virtually protocol-less, much simpler, work by direct addressing, and do not require a request-reply protocol of the MPI. It is therefore inherently faster.

Any I/O device requires only two types of functions; the first is the configuration control received by the device control port, and the second is the synchronous burst transfer of data via the data port. No device-specific codes are necessary outside the I/O device itself, implying no physical layer device driver codes. This device driver model provides a complete hardware abstraction to an OS.

A device bytecode is similar in concept to a CPU ISA (instruction-set-architecture) but implemented in the device modules instead of the main CPU of the PC. This device bytecode working in tandem with the I/O arbiter provides a new computer model and architecture not tied to a particular CPU, at the same time removing physical device drivers. The new model also removes the need for a DMA engine, multi-bus, multi-arbiters, and any I/O bus such as the PCI.

In practical terms, for example in a LAN access device, if a new design requires a new LAN controller chip, the LAN board designer only has to conform to the LAN access specifications and need not worry about any register-specific programming, which is equivalent to the physical layer device driver codes. The new board can be attached without any software modifications at all. This is actually desired in modern operating system though never fully implemented.

Three main benefits are achieved with this device driver model:
i. portable device: complete hardware abstraction and hardware independent; I/O module can be used as is in any computer system without device driver codes, in other words, a device manufacturer need not have to write any OS specific codes;
ii. built-in parallel processing when the main computer processor does not have to execute any physical device driver codes, as the physical device driver executes in the device itself;
iii. Elimination of complicated traditional computer protocols such as multi-bus, multi-arbiters, DMA engines, bus bridges, and bus connectors such as the PCI.

At the logical layer side, the bytecodes serve as the configuration control word to the I/O device sent by the logical device driver of the I/O which resides in the OS memory space. The bytecodes are typically one word which is usually sent during initialization sequences. The bytecodes are sent on to the system data bus and are to be used in conjunction with the system address lines, and three synchronous burst transfer signals; the CLK, STP1, and STP2 signals. Once the bytecodes are sent and received by the addressed I/O device via the control port, subsequent synchronous burst transfer of data can be carried out via the data port.

BRIEF DESCRIPTION OF THE DRAWINGS

A more complete understanding of the invention may be obtained by reading the following description of a specific illustrative embodiment of the invention in conjunction with the appended drawings which are described as follows.

DESCRIPTION OF PREFERRED EMBODIMENTS

Figure 4:
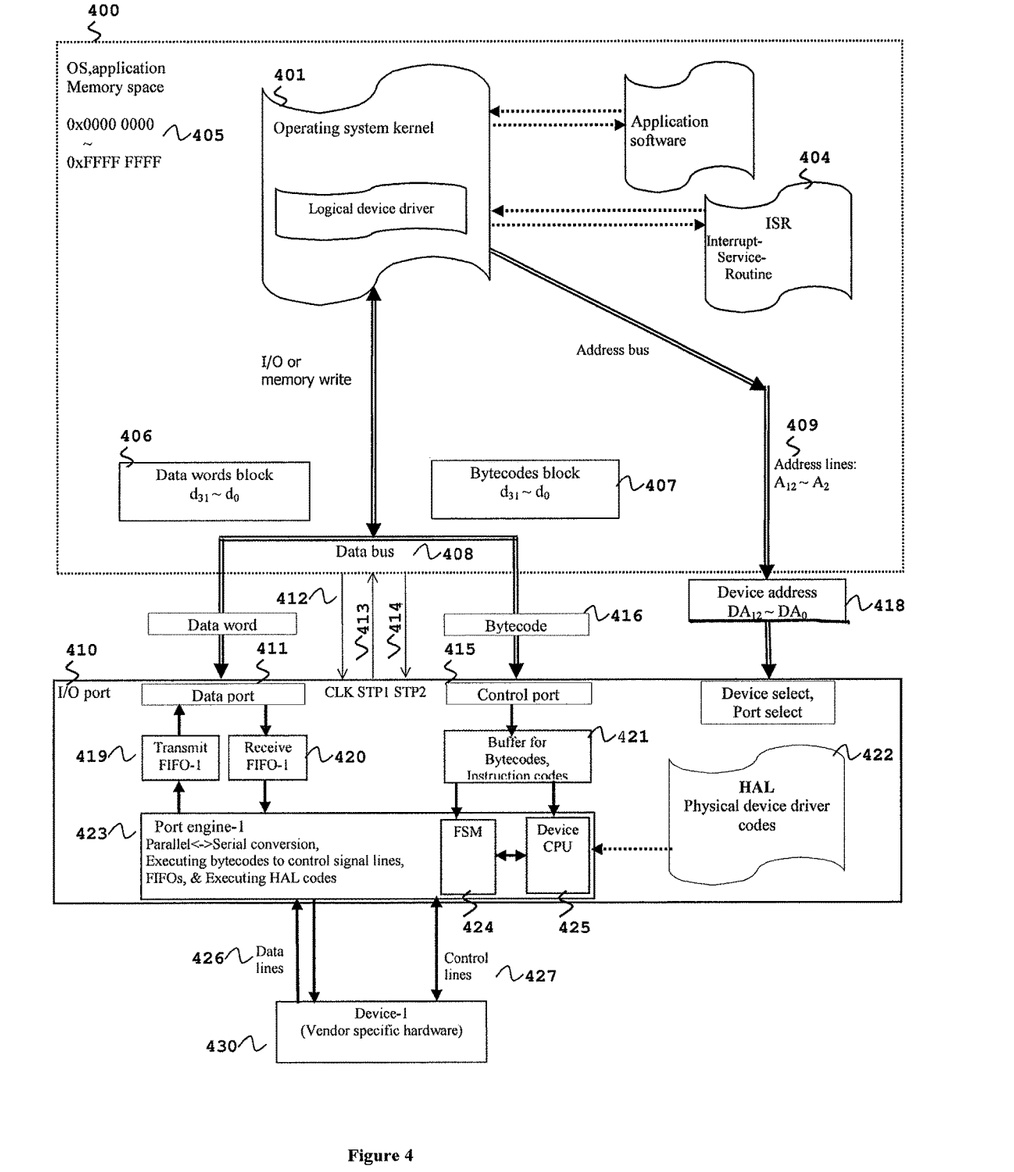
FIG. 4 shows the position and hierarchy of OS software memory space, bytecodes, physical device driver codes, HAL, and vendor specific device hardware. In this figure, the kernel can transfer blocks of words either to the device data port, or the device control port, with a CPU memory or I/O write instruction along with the address of either of the two ports' address.
Figure 5:
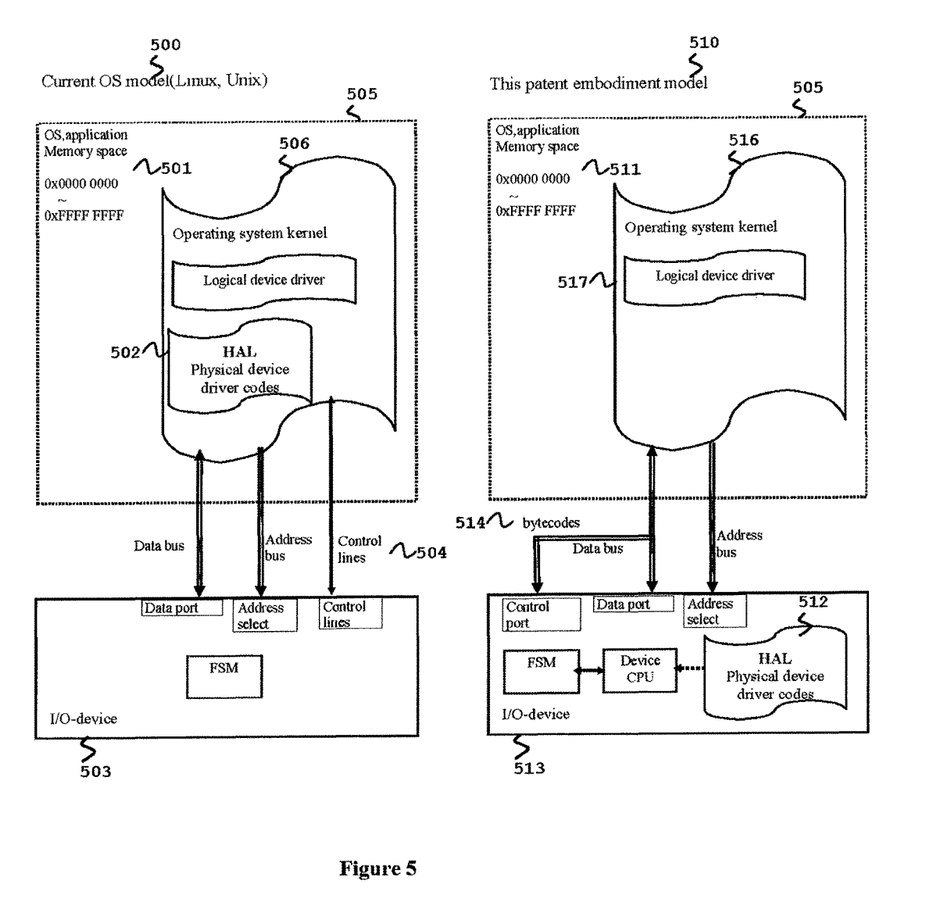
FIG. 5 shows that the diagram in FIG. 4 can be reduced to its simple form showing the position of the HAL in current OS model on the left, versus this patent model on the right.

The key to understanding this invention is from FIG. 5 which is a simplified version of FIG. 4, but with the addition of a simplified model of current device driver implementation (500) to be compared with this invention embodiment (510). Current OS model implementing hardware devices places the HAL (hardware abstraction layer) (502) within the system memory space (501) as shown in FIG. 5. In this scheme the HAL (502) contains device-specific codes which directly control the device (503) directly by way of the control lines (504). This system memory space (501) is defined as everything within the dotted box (505). The OS kernel (506) executes the HAL codes (502) since it is called within the OS memory space (501).

In comparison the diagram on the right which is this invention embodiment (510) has moved the HAL (512) out of the system memory space (511) and placed it within the device (513) itself. In this scheme the OS gains access to the HAL (512) via the bytecodes (514). The OS kernel (516) can only access the device (513) via the logical device driver (517) which is homogenous across systems, and cannot directly execute the HAL codes (512) since it is now out of the OS memory space (511). The logical device driver (517) can request transfer of data, and configure the device (513) via the bytecodes (514). The device (513) now offers no control lines (504) to the outside world, but only using the same bytecodes (514) associative with the device type (300) (shown in FIG. 3) to offer the same capability and services.

Figure 1:
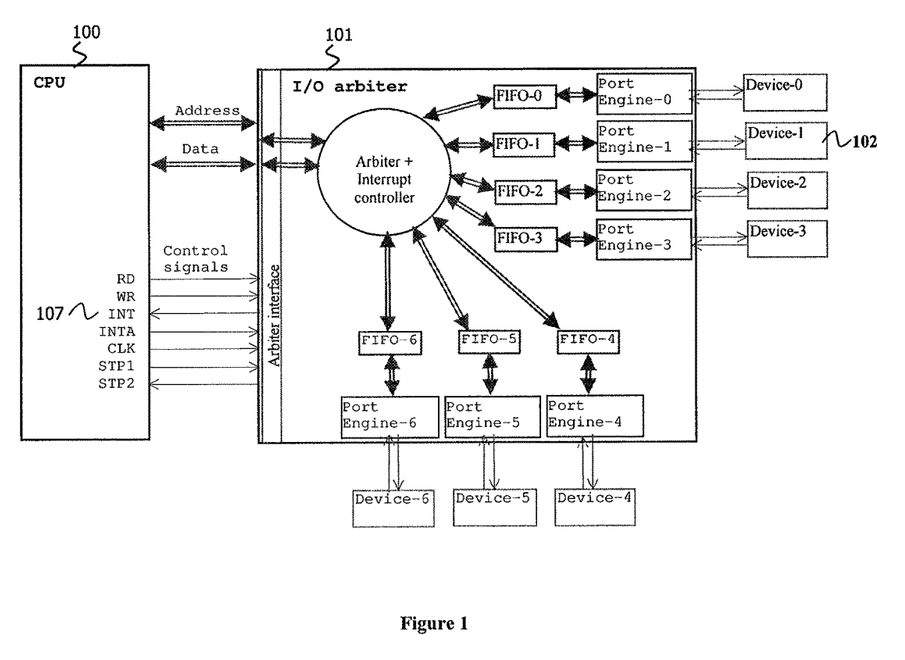
FIG. 1 shows the OS-device model invention with the CPU. The I/O arbiter removes the need for traditional bus control like DMA, bus request-grant, bridges, multi-arbiters, and I/O bus such as the PCI.
Figure 2:
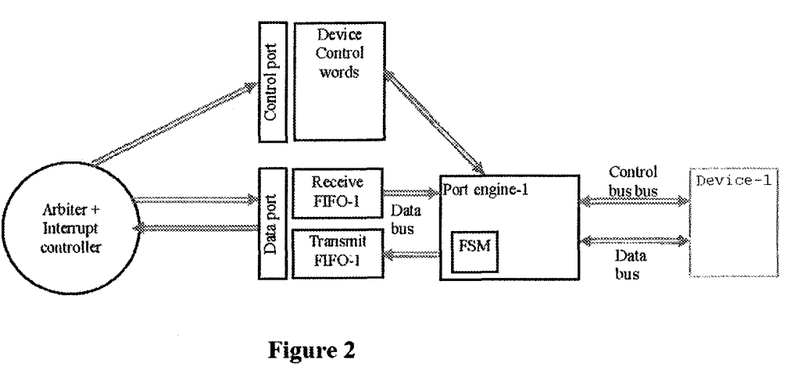
FIG. 2 shows an expanded block functional diagram for device-1 data path from FIG. 1.
Figure 3:
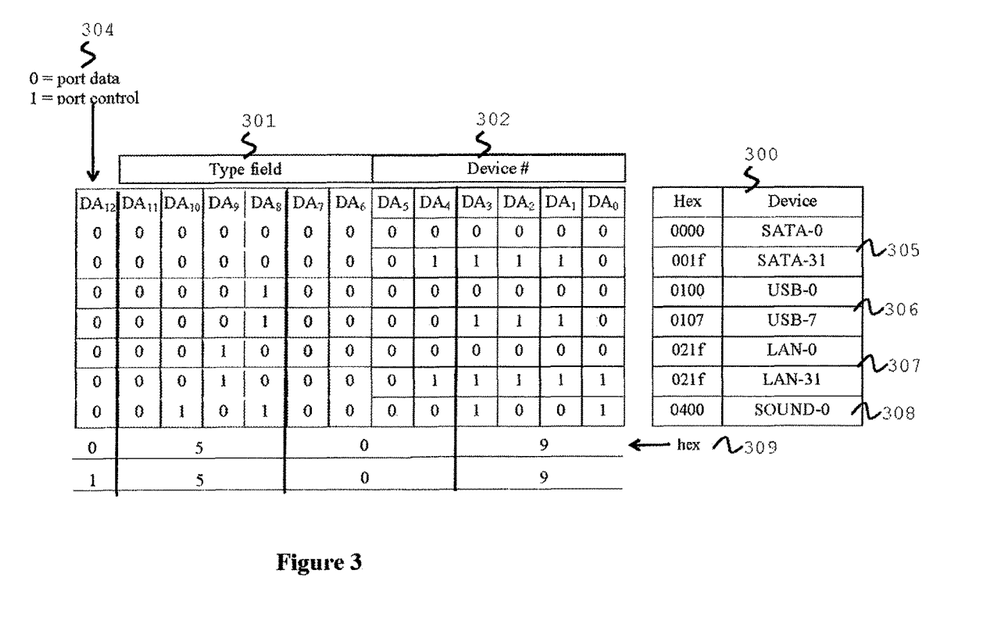
FIG. 3 shows a table for a device using 13-bit address lines, with two 6-bit device fields and a 1-bit control data port select. From this table, for the sound-0 device ID=0x509 addresses its data port, with DA12=1 making device ID=0x1509, addresses its control port.

Detailed description is mostly based on FIG. 4, with minor support from FIG. 3, FIG. 2, and FIG. 1.

The description is chosen for device-1 (102) which concerns the data path for the device and is representative for all other devices. The location of device-1 (102) is shown in FIG. 1 which shows its functional position in relation to the system I/O arbiter (101) and the system processor (100). The data path for device-1 (102) is then narrowed down to just its own position to the I/O arbiter (101) and the systems functional operation as in FIG. 2.

The embodiment of the OS device driver model as shown in FIG. 4 can accommodate any vendor-specific hardware devices with differing data lines (426); whether they use serial data, 4-bit wide parallel data, byte-wide parallel data, or the full 32-bit word data. Device-1 (430) which is external to the I/O port (410) connects directly to the I/O port engine-1 (423) which at its simplest consists of a FSM (finite state machine) (424) and if complex also includes a dedicated processor (425). The port engine-1 (423) is responsible for parallel and serial conversion executing bytecodes (407)

to control signal lines (427), control of FIFOs (419), (420), and executing HAL (422) codes.

The port engine FSM (424) is programmed to read bytecodes (407) presented at the control port (415) in conjunction with the three synchronous signals CLK (412), STP1 (413) and STP2 (414). The control port (415) is selected based on the 13-bit address lines (418) when $DA_{12}=1$ (304) (in FIG. 3) informing the I/O port (410) that the data word on the data bus (408) is a byte code (416). If a block of bytecodes (407) are meant to be transmitted, the FSM (424) buffers the bytecode block (407) in the device control word buffer (421). The FSM (424) then executes the bytecodes (421) in the buffer (421) at the termination of the block or burst transfer by the active STP1 (413) signal. The bytecodes (421) are usually executed only once during the initialization and configuration stage. Once the bytecodes (421) are executed, the burst transfer of data can commence.

The FSM (424) can also download bytecodes (407) as instruction codes (421) for the device processor (425) if implemented. In this case the device processor (425) will execute the HAL (422) codes when necessary and it is especially useful in future upgrades of device functions.

Once the I/O port (410) is configured, the burst transfer of data words can take place on the data port (411) when it is selected by the 13-bit address lines (418) when $DA_{12}=0$ (304). Thus burst transfer of data words to the I/O port (410) is selected by just specifying the 3-digit hexadecimal (hex) address of the device ID (300) from $DA_{11} \sim DA_6$, and by prefixing a "1" in front of the 3-digit hex number, or by adding 0x1000 selects the device control port (415). For example, for a device ID=0x509 addresses its data port, with $DA_{12}=1$ making device ID=0x1509 in which the control port is addressed.

The 13-bit address lines (418,300) specifying a particular I/O port (410) and its associated hardware device follows an addressing scheme 300 as depicted in FIG. 3. The I/O port (410) and the device numbering scheme (300) should not change as any address offset (418,300) with these numbers will uniquely identify the exact device installed which requires no device mapping and therefore speeds access times.

Device addresses begin from an offset address (300) of devices space in the kernel (401) physical address (409). The address requires a 13-bit addressing (418) with only two specifications; the MSb (most significant bit) field 301 $A_{11} \sim A_6$ specifies the type of device (HDD, Lan, etc . . . ), and the LSb specifies the device number (302) $A_5 \sim A_0$. $A_{12}$ selects either the data port (411) or the control port (415). The two fields make up a unique device ID (309,300). Short addressing has the advantage of fewer interfacing lines, and dispensing the need for two address-data phases like that of the PCI protocol. FIG. 3 shows an example of the device numbering scheme 300 and assignment for the SATA drives (305), the USB devices (306), the Lan devices (307) and the sound device (308).

Data (426) from the external device-1 (430) which can be in serial form, nibble wide or some number of bytes (426) in a word sends data to the I/O port (410) using the control signal lines (427) peculiar only to the device. The port engine-1 (423) converts whatever data format received to the bus size (408) of the system which is 32-bit word, and buffers in the transmit FIFO-1 (419) until it is full according to the size initialized. Once full the FSM (424) activates an interrupt (107) to the I/O arbiter (101) to inform the processor (100) that data words are ready for burst transfer. The processor (100) via the ISR (interrupts service routine) (404) receives the data block (406) by synchronously dumping it to its main memory (405) using the same CLK (412), STP1 (413) and STP2 (414) signals.

The I/O port-1 (410) receives a block of data words (406) from the processor or kernel (401) when its data port (411) is selected, and together with the three synchronous signals (412, 413, 414) buffers them into the receive FIFO-1 (420) until it is full according to the size initialized. Once full the FSM (424) reads the data words and performs the necessary conversion to the data format of the device-1 (430) and begins transmitting the data block to device-1 (430) in conjunction with the device control signal lines (427).

The present invention or any part(s) or function(s) thereof may be implemented using hardware, software, or a combination thereof, and maybe implemented in one or more computer systems or other processing systems. The computer system can include a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer program medium or computer usable storage medium having stored therein computer software and/or data. The terms "computer program medium" and "computer usable storage medium" are used to refer generally to media such as the removable storage drive, a hard disk installed in the hard disk drive, and signals. These computer program products provide software to the computer system. Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

The invention claimed is:

1. A uniform and homogenous access method of devices, comprising:
   providing a first device that comprises an operating system (OS) kernel and a logical device driver,
   providing a second device that comprises a physical device driver and physical device driver codes that can be executed by the physical device driver, wherein the second device is an input/output (I/O) device,
   receiving, by a control port of the second device, a configuration control sent by the first device, and
   receiving, by a data port of the second device, a synchronous burst transfer of data sent by the first device, wherein a local addressing scheme, and bytecodes over the control port and the data port are within a homogenous system,
   thereby enabling the first device to access and control the second device, wherein device-specific codes of the second device are not stored in the first device.

2. A device for implementing the method according to claim 1, the device comprising:
   at least one pair of transmit and receive FIFO (first-in-first-out), and an I/O arbiter that arbitrates access to a system data bus by arbitrating the at least one pair of transmit and receive FIFO, wherein the device utilizes interplay of the I/O arbiter, device bytecodes, and at least three synchronous burst transfer signals to achieve an improved computer protocol, and wherein the synchronous burst transfer is a parallel transfer of 32-bit data contiguously to and from a main memory on every clock tick supplied by a CPU (central processing unit).

3. The method according to claim 1, wherein the data port only supports the synchronous burst transfer using three synchronous signals CLK, STP1, and STP2, and the control port is accessed using device bytecodes which are portable across all hardware and OS platforms, wherein the device bytecodes are one 32-bit word or a block of words sent to a selected device on its control port, specifying the information necessary for transfer of a block of data.

4. The method of claim 1, further comprising:

sending a bytecode or a block of bytecodes to the control port which is selected using 13-bit address lines, wherein the synchronous burst transfer of words to the control port is achieved with bit-12 of the 13-bit address lines determining a particular port; and selecting the device control port when the bit-12 of the 13-bit address lines is equal to 1.

5. The method of claim 3, wherein the synchronous burst data transfer is achieved on the data port when the data port is selected using the 13-bit address lines, and the synchronous burst data transfer of words from a processor memory space is achieved with bit-12 of the 13-bit address lines determining the particular port, and when the bit-12 of the 13-bit address lines is equal to 0, the device data port is selected.

6. The method of claim 4, further comprising:

determining a device ID (identification) by the 13-bit address lines which can be placed at an offset address of devices space in a physical address of a system, in which the 13-bit address lines are divided into a 6-bit MSb (most significant bit) field and a 6 bit LSb (least significant bit) field, wherein the 6-bit MSb field specifies the type of device and the 6-bit LSb specifies a device number (device-0 to device-63(0x3f)), wherein the 6-bit MSb field and 6 bit LSb field make up a unique device ID, and thus a maximum number of 4096 devices can be uniquely assigned.

7. The method of claim 1, further comprising:

enabling parallel processing which is achieved in a system of the first device with a system processor of the first device executing codes and the second device executing the attached physical device driver codes, wherein a main computer processor of the first device does not have to execute any physical device driver codes, as the physical device driver of the second device executes within the second device itself the physical device driver codes, which is invisible to the memory space of the system of the first device.

8. The method of claim 5, further comprising:

determining a device ID (identification) by the 13-bit address lines which can be placed at an offset address of devices space in a physical address of a system of the first device, in which the 13-bit address lines are divided into a 6-bit MSb (most significant bit) field and a 6 bit LSb (least significant bit) field, wherein the 6-bit MSb field specifies the type of device, and the 6-bit LSb specifies a device number (device-0 to device-63 (0x3f)), wherein the two fields make up a unique device ID, and thus a maximum number of 4096 devices can be uniquely assigned.

* * * * *